United States Patent
Thomasson

(10) Patent No.: US 7,817,660 B2
(45) Date of Patent: Oct. 19, 2010

(54) HIGH CAPACITY SCHEDULER

(75) Inventor: Rikard Thomasson, Göteborg (SE)

(73) Assignee: Telefonaktiebolaget L M Ericsson (Publ), Stockholm (SE)

( * ) Notice: Subject to any disclaimer, the term of this patent is extended or adjusted under 35 U.S.C. 154(b) by 159 days.

(21) Appl. No.: 12/093,266

(22) PCT Filed: Nov. 18, 2005

(86) PCT No.: PCT/IB2005/053814

§ 371 (c)(1),
(2), (4) Date: May 9, 2008

(87) PCT Pub. No.: WO2007/057728

PCT Pub. Date: May 24, 2007

(65) Prior Publication Data

US 2008/0279099 A1 Nov. 13, 2008

(51) Int. Cl.
*H04L 12/54* (2006.01)
*H04L 12/56* (2006.01)
(52) U.S. Cl. .............. 370/429; 370/395.42; 370/412

(58) Field of Classification Search .............. None
See application file for complete search history.

(56) References Cited

U.S. PATENT DOCUMENTS

| 7,631,247 | B2 * | 12/2009 | Petrovic et al. | ............. 714/776 |
| 2004/0258070 | A1 * | 12/2004 | Arima | ............. 370/395.4 |
| 2005/0213587 | A1 * | 9/2005 | Cho et al. | ............. 370/395.42 |
| 2006/0114936 | A1 * | 6/2006 | Paffen | ............. 370/469 |

* cited by examiner

*Primary Examiner*—Ricky Ngo
*Assistant Examiner*—Clemence Han
(74) *Attorney, Agent, or Firm*—Roger S. Burleigh

(57) ABSTRACT

A first interface for receiving downlink data packets from a core network, a second interface for transmitting data packets to user entities, a processor comprising a scheduler, a first memory partition comprising and parameter data pertaining to a first subset of allocated priority queues, a second memory partition comprising parameter data pertaining to a second subset of allocated priority queues, is provided. The processor is transferring parameter data between the first and second memory partitions, and vice versa, whereby parameter data for priority queues having no data packets in corresponding buffers is prioritized for being transferred to the first memory partition, parameter data for priority queues having data packets in corresponding buffers is prioritized for being transferred to the second memory partition, the processor performing scheduling based on a selection of priority queues whose parameter data is residing in the second memory partition.

19 Claims, 8 Drawing Sheets

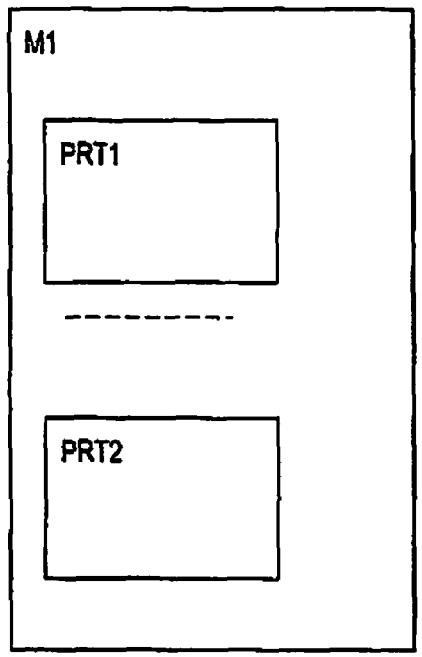
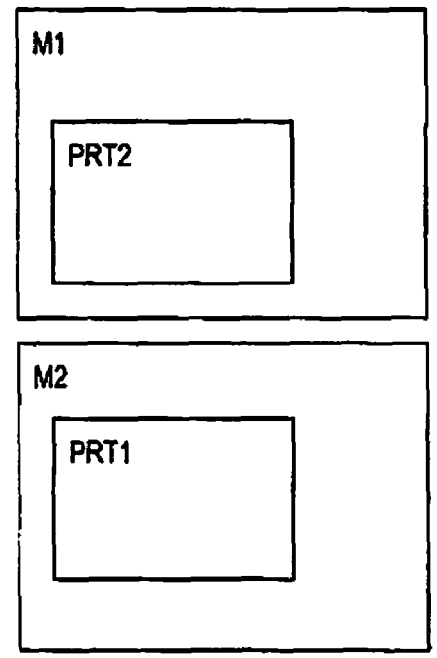
FIG. 6    FIG. 7
| TTI | 1 | 2 | 3 | 4 | 5 | 6 | 7 |
|---|---|---|---|---|---|---|---|
| QB(X,Y) | - | - | P1 | P1 | P1, P2 | P1, P2 | P2 |
| DI(X,Y) | 0 | 0 | 1 | 2 | 3 | 0 | 0 |
| MEM FOR QB_PAR(X,Y) | PRT1 | PRT1 | PRT1 | PRT1 | PRT1 | PRT2 | PRT2 |
| SSR | - | - | - | - | - | P1 | 0 |
| TTI | 8 | 9 | 10 | 11 | 12 | 13 | 14 |
|---|---|---|---|---|---|---|---|
| QB(X,Y) | P2 | - | P3 | - | - | - | - |
| DI(X,Y) | 0 | 0 | 1 | 2 | 3 | 4 | 5 |
| MEM FOR QB_PAR(X,Y) | PRT2 | PRT1 | PRT1 | PRT1 | PRT1 | PRT1 | PRT1 |
| SSR | P2 | - | - | - | - | - | - |
FIG. 11

HIGH CAPACITY SCHEDULER

FIELD OF THE INVENTION

The present invention relates to scheduling of data being transmitted over the air interface. More particular, the invention relates to a method and an apparatus for HSDPA scheduling.

BACKGROUND OF THE INVENTION

In HSDPA (High Speed Data Packet Access), where many users utilize physical resources on a specific shared channel, a packet scheduler is needed for scheduling the packets at given time instants, or transmission opportunities. The task of the scheduler is to select a user or a plurality of users that shall be allowed for having a transmission performed during a certain transmission time interval (TTI). In a cellular system, data queues pertaining to individual users are consecutively evaluated. Various selections shall be done at every scheduling instant, e.g. at every sub-frame for HSDPA, and according to a certain scheduling strategy.

Packet schedulers and scheduling strategies for HSDPA are widely known in the art. For HSDPA, the packet scheduler is located in the MAC-hs sub layer of layer 2, on the UT-RAN side. This is standardized according to 3GPP TS 25.321, Medium Access Control (MAC) protocol specification, c.f. FIG. 1.

FIG. 1 shows different entities required for the traffic data handling in the MAC-hs layer. A user given access to the HSDPA service comprises a number of MAC-d flows, sent on the Iub interface, each one containing packets of one or several priorities. These packets are buffered in MAC-hs in different priority queues via the priority queue distribution entity. Furthermore, as can be seen, there exists a scheduling/priority handling routine that considers all priority queues and selects which one shall transmit for each transmission opportunity. The priority queue selected for transmission is allocated resources in the so called HARQ (Hybrid Automatic repeat Request) entity, where the scheduled packet is stored for transmission and possibly one or more retransmissions. Finally there is a TFRC (Transport Format and Resource Combination) selection routine running that decides, for each transmitted package how much physical resources shall be allocated in terms of transmission power (W), number of HS-PDSCH codes and modulation (QPSK/16QAM (Quadrature Phase Shift Keying/16 Quadrature Amplitude Modulation)).

In FIG. 2, a known network is shown comprising a content server, a core network (CN), a radio network controller (RNC), a radio base station (RBS) and a plurality of user entities (UE1 . . . UEn). Downlink Traffic data pertaining to each user entity is transmitted through the RNC and further on to the RBS, whereby data is buffered in queues residing in the RNC, index QN, respectively and in the RBS, index QB, respectively.

Prior art document WO2005/034418 shows a medium access control (MAC) priority queue based scheduling pertaining to HSDPA. The scheduling unit is based on hybrid automatic repeat request (HARQ) entity and a TFRC entity.

Each user entity may require various scheduling priorities for various data streams, depending on the service. Voice over IP may e.g. require 2 scheduling priorities, while web surfing only a single scheduling priority reflecting the best effort nature of the service. For this reason, a number of specific queues are set up in both the RNC and the RBS, pertaining to a given user entity and data stream. By way of example, data queue QB(1, 2) corresponds to packets for user entity UE1, second scheduling priority.

Data pertaining to each user entity is transmitted from the content server over the core network, further on over the Iu Interface to the RNC where various data corresponding to various respective data streams are stored in priority queues. The data of queues in the RNC in FIG. 2 may be identified by QN(UE, DS), where UE is the user entity number and DS is the identifier for the particular data stream. Since a service typically consists of several parallel data streams, there may be several priority queues for a given user entity, or there may be only one queue of traffic data, in the RNC or in the RBS respectively. The priority queues may contain one or more packets or no packets at all. However, once a user is allocated to the HSPDA service of the network, data could be expected for that particular user.

In known solutions, all priority queues of all users are considered for transmission in a scheduler in each sub-frame. Thus, in the hardware implementation, for each priority queue that is allowed, the HSDPA service in a cell demands a certain amount of clock cycle capacity and memory consumption. This puts a fundamental limit on scheduler capacity.

SUMMARY OF THE INVENTION

It is a first object to set forth a scheduler unit, which can manage an enhanced level of end user traffic more efficiently for given hardware resources.

This object has been accomplished by the subject matter defined in claim 1.

It is a second object to set forth a method for selection and scheduling that can manage an enhanced level of end user traffic more efficiently for given hardware resources.

This object has been accomplished by the subject matter set forth in claim 14.

Further objects and advantages will appear from the detailed description of preferred embodiments of the invention.

BRIEF DESCRIPTION OF THE FIGURES

FIG. 6 shows a first alternative for arranging a priority subset in memory according to the invention, FIG. 7 shows a second alternative for arranging a priority subset in memory according to the invention, FIG. 11 shows an exemplary outcome of the invention.

DETAILED DESCRIPTION OF PREFERRED EMBODIMENTS OF THE INVENTION

Notation

Figure 1:
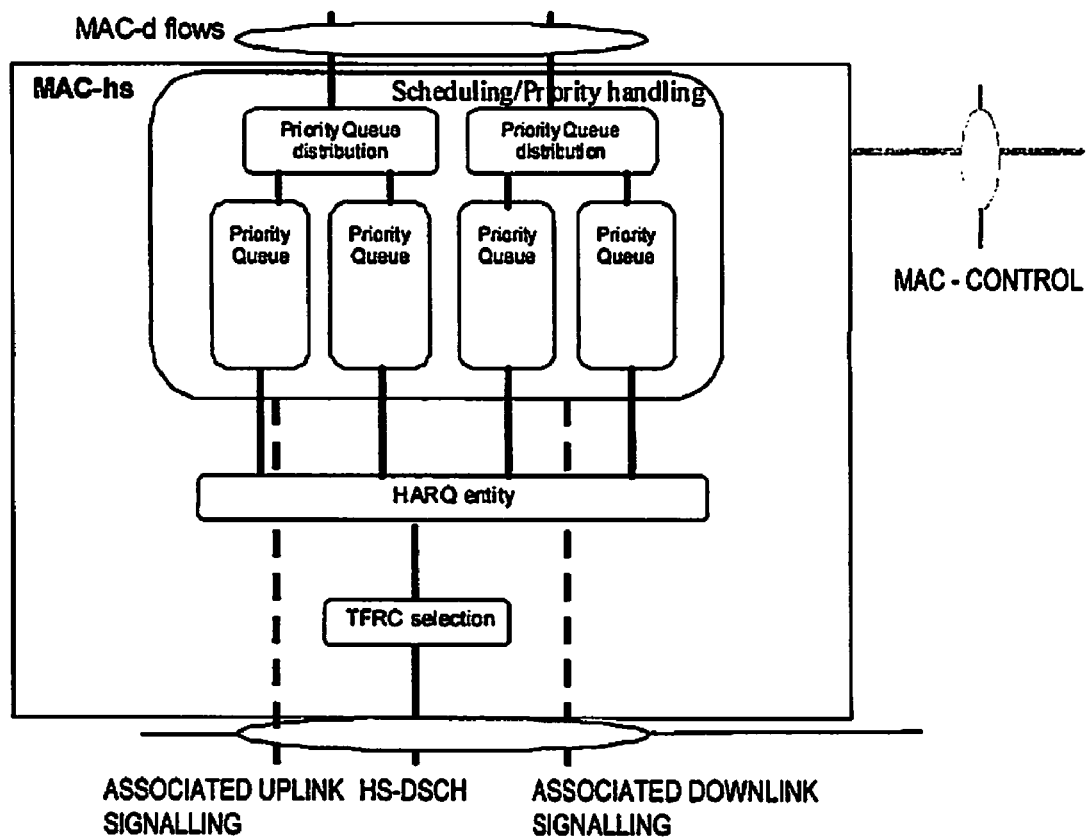
FIG. 1 shows a known MAC model pertaining to standard 3GPP TS 25.321.
Figure 2:
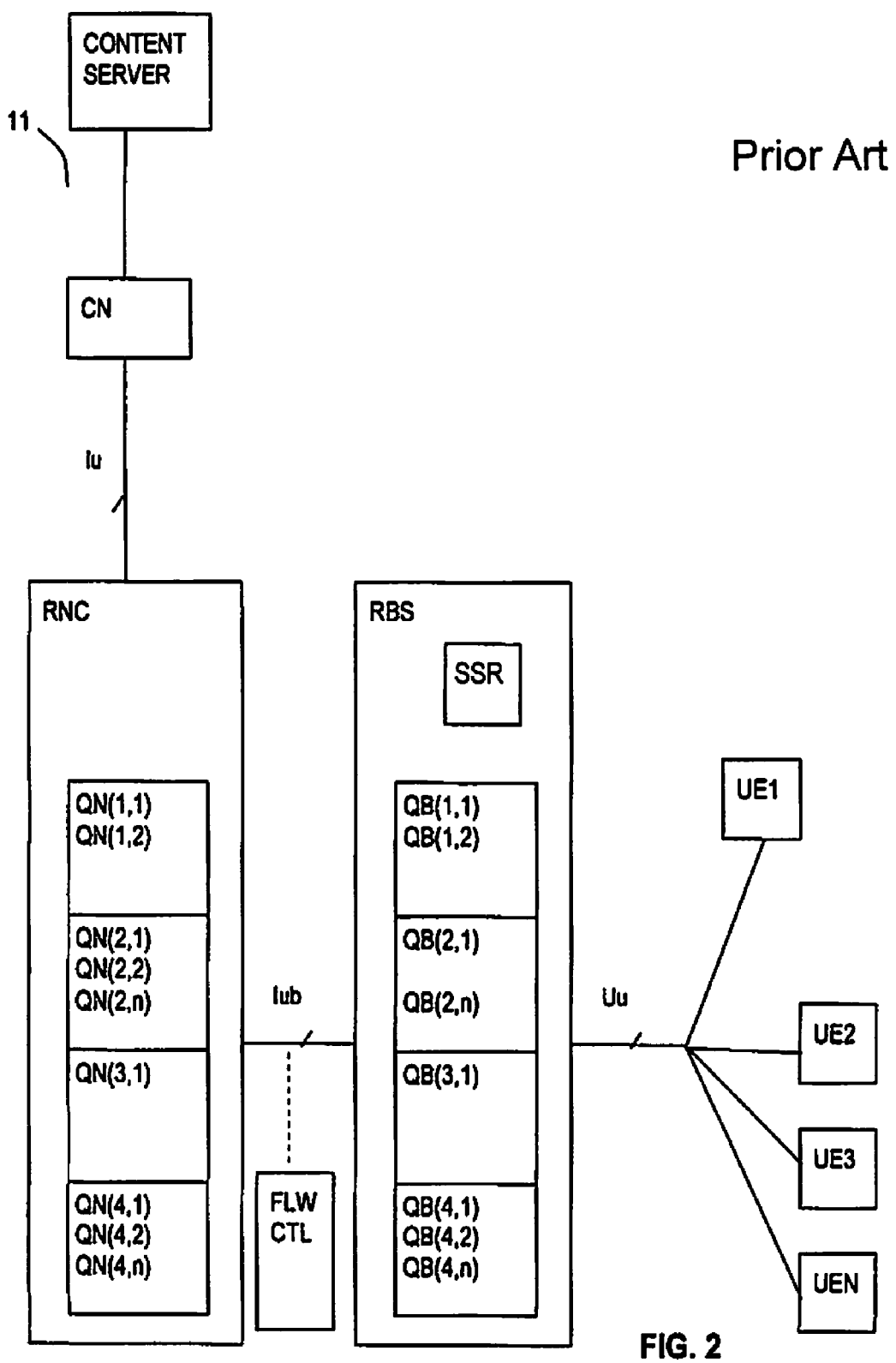
FIG. 2 shows components of a known 3G radio network.

A given user entity UEX according may require a number of priority queues, PQ(X,Y) PQ(X, Z) relating to the data of incoming packets for different priorities. Accordingly, in the radio base station, knowledge is established for buffering, managing and transmitting the data streams to be delivered to the individual user entities. The structure of this data as well as the used notation for each individual user entity has been illustrated in FIG. 3. The data relates to the specified MAC-hs handling seen in FIG. 1. The figure comprises a representation of a UE granted service to HSDPA. It consists of a HARQ entity (HE) and also a number of priority queues (c.f. FIG. 1). Each priority queue PQ(X,Z), in turn, has been further broken down into three different entities. Namely, QB(X,Z) is representing the buffered traffic data (packets) of the priority queue, QB_PAR(X,Z) representing the parameter subset of the priority queue, and DI(X,Z) representing the delay of each priority queue. These three representations will be described in detail later.

Figure 3:
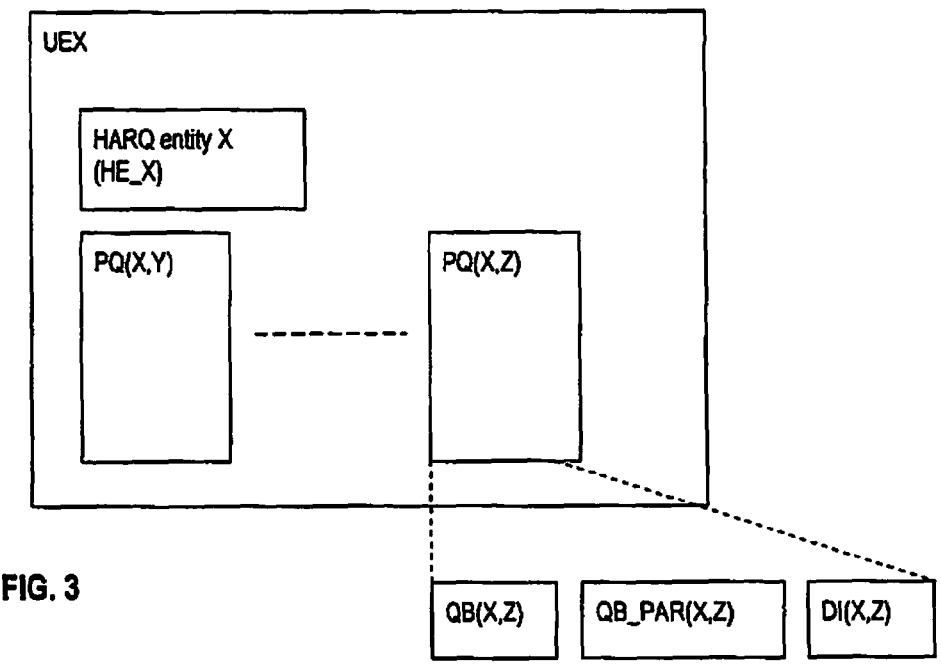
FIG. 3 shows a user and priority queue representation according to a preferred embodiment of the invention.
Figure 4:
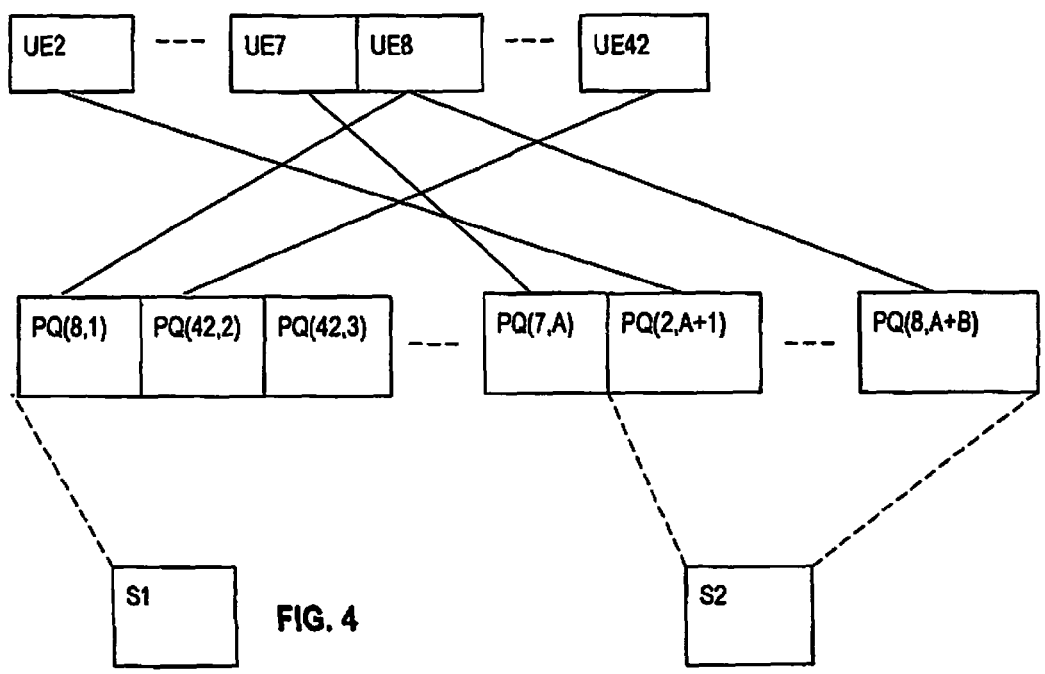
FIG. 4 shows a user and priority queue indexing and memory partitioning according to the preferred embodiment of the invention.

In FIG. 4, the indexing employed for an exemplary situation of a preferred embodiment of the invention is illustrated. The ensemble of all priority queues PQ for all users UE are arranged in one array with index $1, \ldots, A+B$. Where A+B is the maximum number of priority queues that can be set up in a particular cell. The users that each one of the priority queues belong to is simply denoted X and could range from $1, \ldots,$ Nue, where Nue is the maximum number of users (UE) that can be set up in the very same cell, see FIG. 3.

The priority queues are denoted PQ(X, $1, \ldots, A+B$) in this description. The index X represents any user (in range $1, \ldots,$ Nue) which happens to be connected to the priority queue in question.

Figure 5:
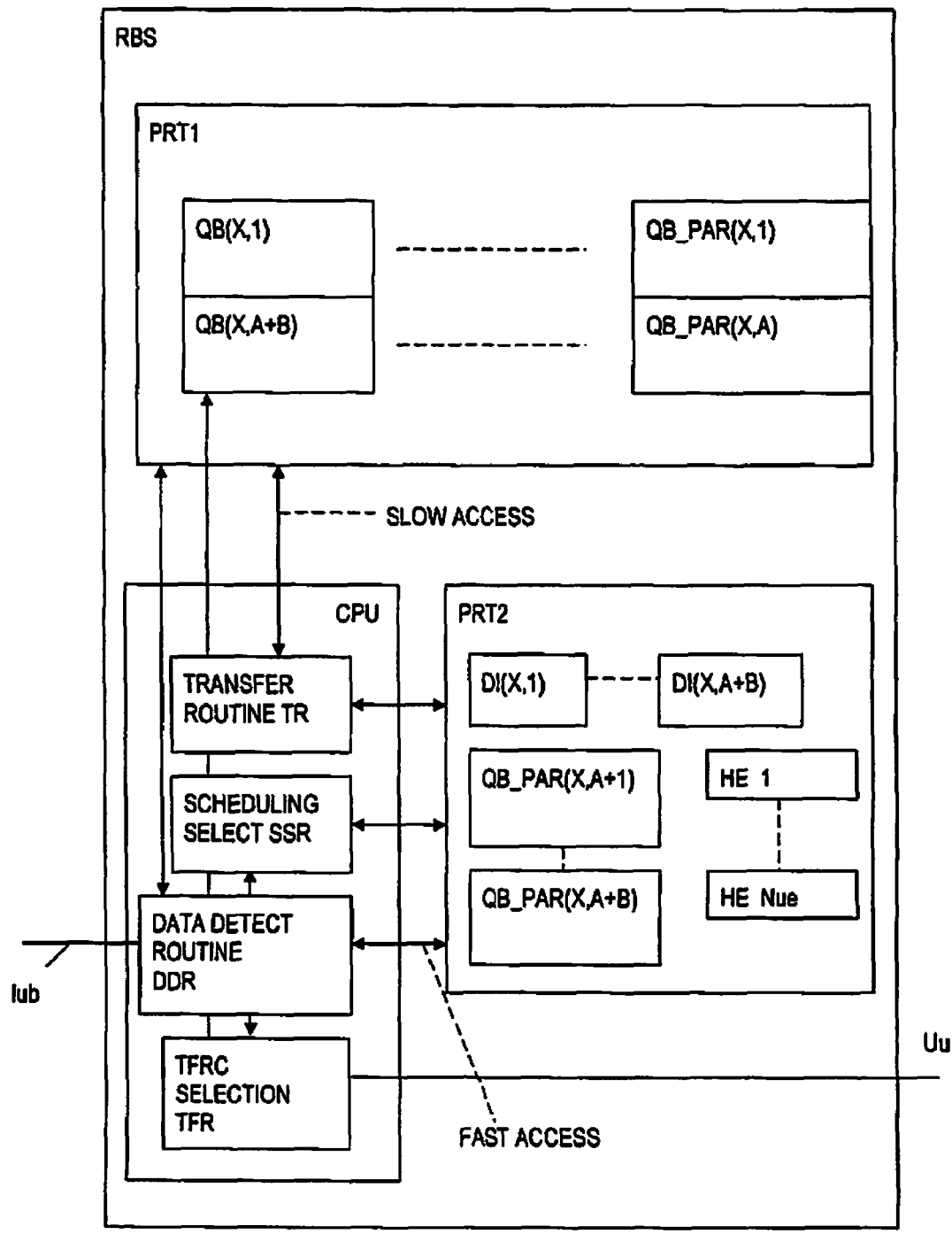
FIG. 5 shows a radio base station (RBS) according to a preferred embodiment of the invention.

Furthermore, with regard to FIGS. 3-5, the array of priority queues are divided into two different subsets, whereby $S1=\{PQ(X, 1), \ldots, PQ(X, A)\}$ and $S2=\{PQ(X, A+1), \ldots, PQ(X, A+B)\}$. The subset $S=S1 \cup S2$ is the totality of all priority queues in the cell. In the example outlined in FIG. 4, it can be seen that the UE with index 8 has one priority queue residing in priority set S1 and another residing in S2. This situation is allowed.

Base Station

In FIG. 5, a preferred embodiment of a radio base station RBS is shown comprising a first Interface (Iub) for receiving downlink data packets from a core network CN, a second Interface (Uu) for transmitting data packets to user entities, a processor CPU comprising or running a scheduling selection routine SSR, implementing the scheduling/priority handling in FIG. 1, a transfer routine TR, and a data detect routine DDR, implementing the priority queue distribution mechanism in FIG. 1. Finally, the standardized TFRC selection routine TFR is provided for allocation physical resources for the selected packet and transmit it on the Uu interface.

Figure 8:
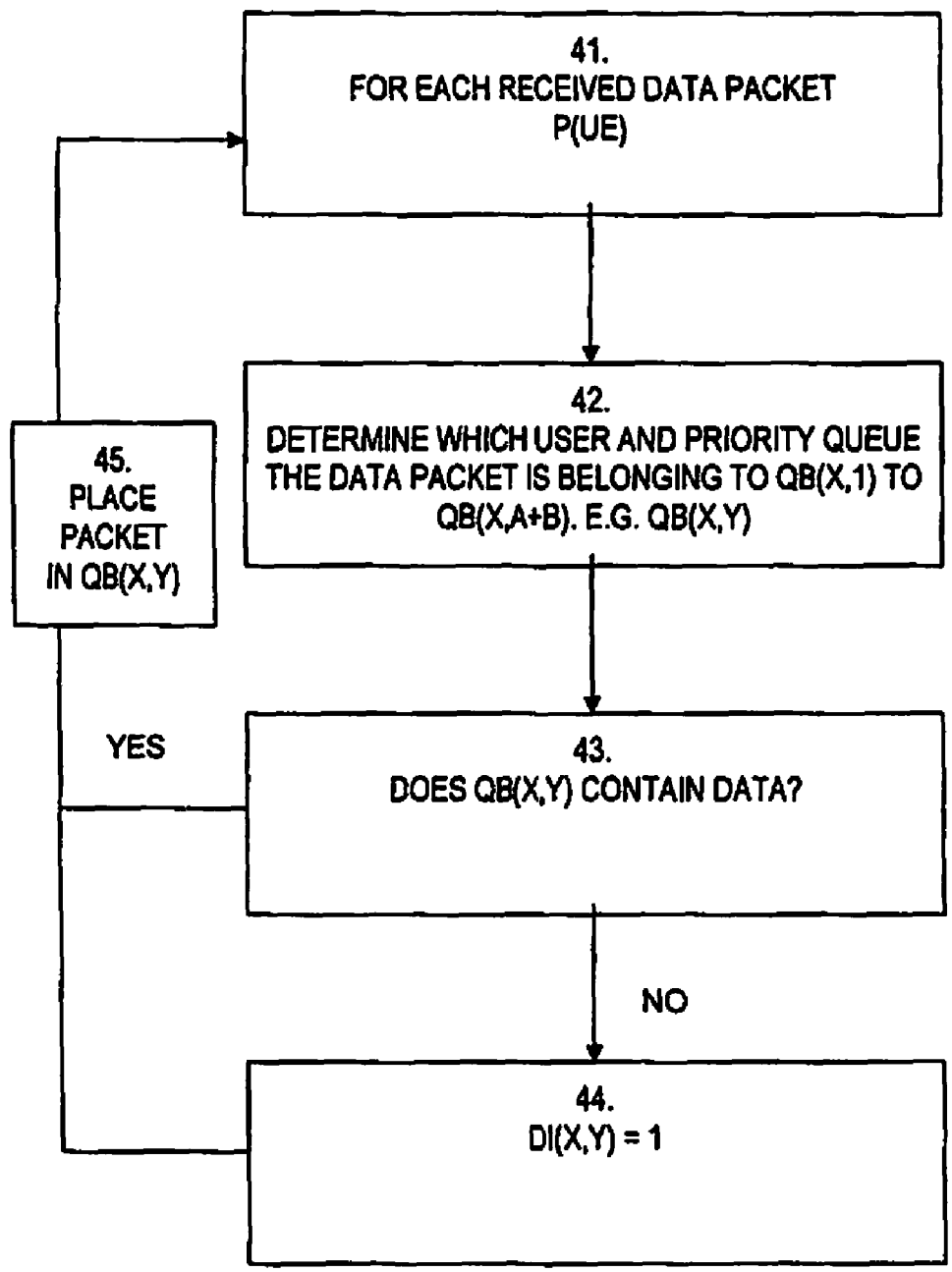
FIG. 8 shows a data detect routine used in the RBS of FIG. 5.
Figure 9:
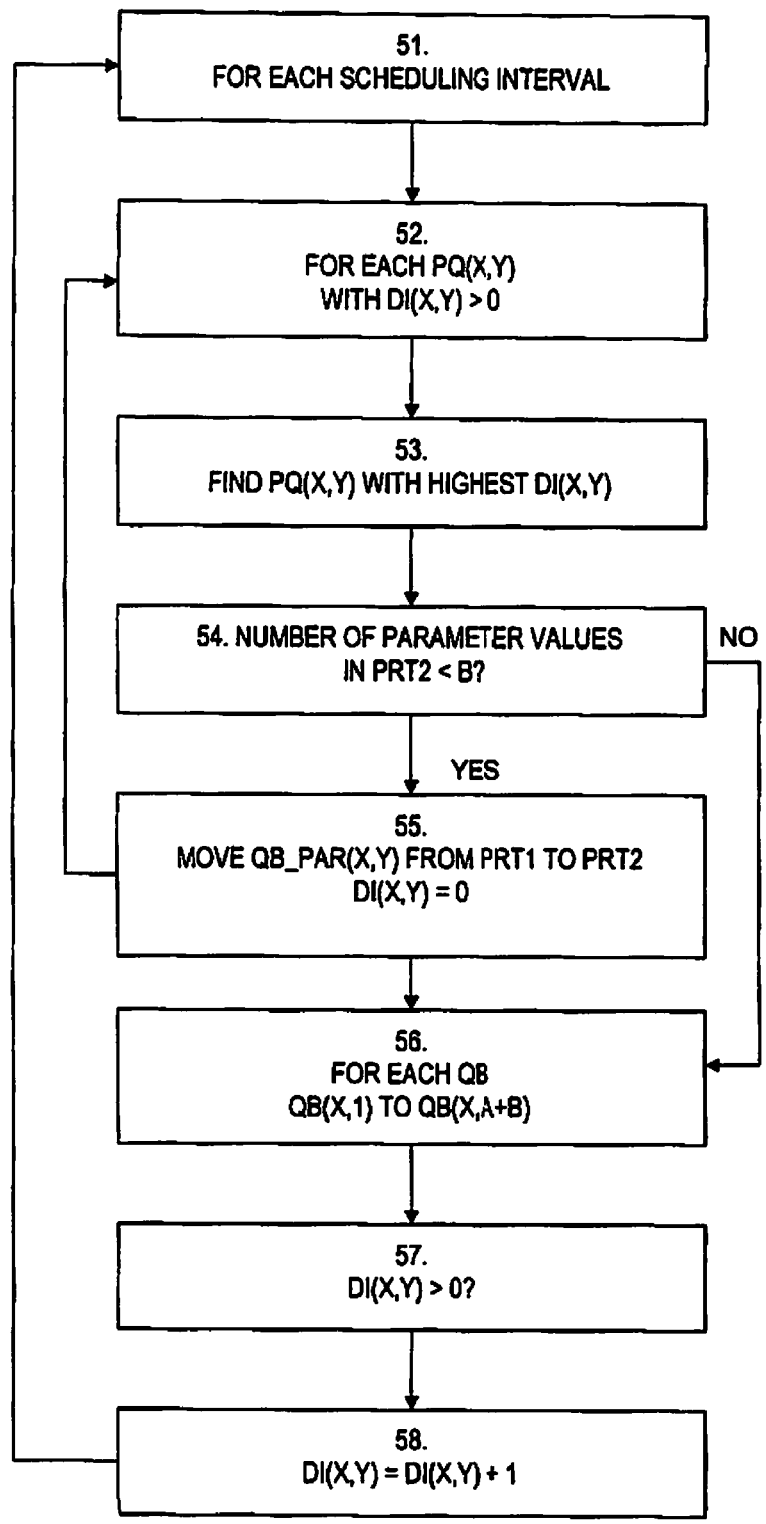
FIG. 9 shows a transfer routine used in the RBS of FIG. 5.
Figure 10:
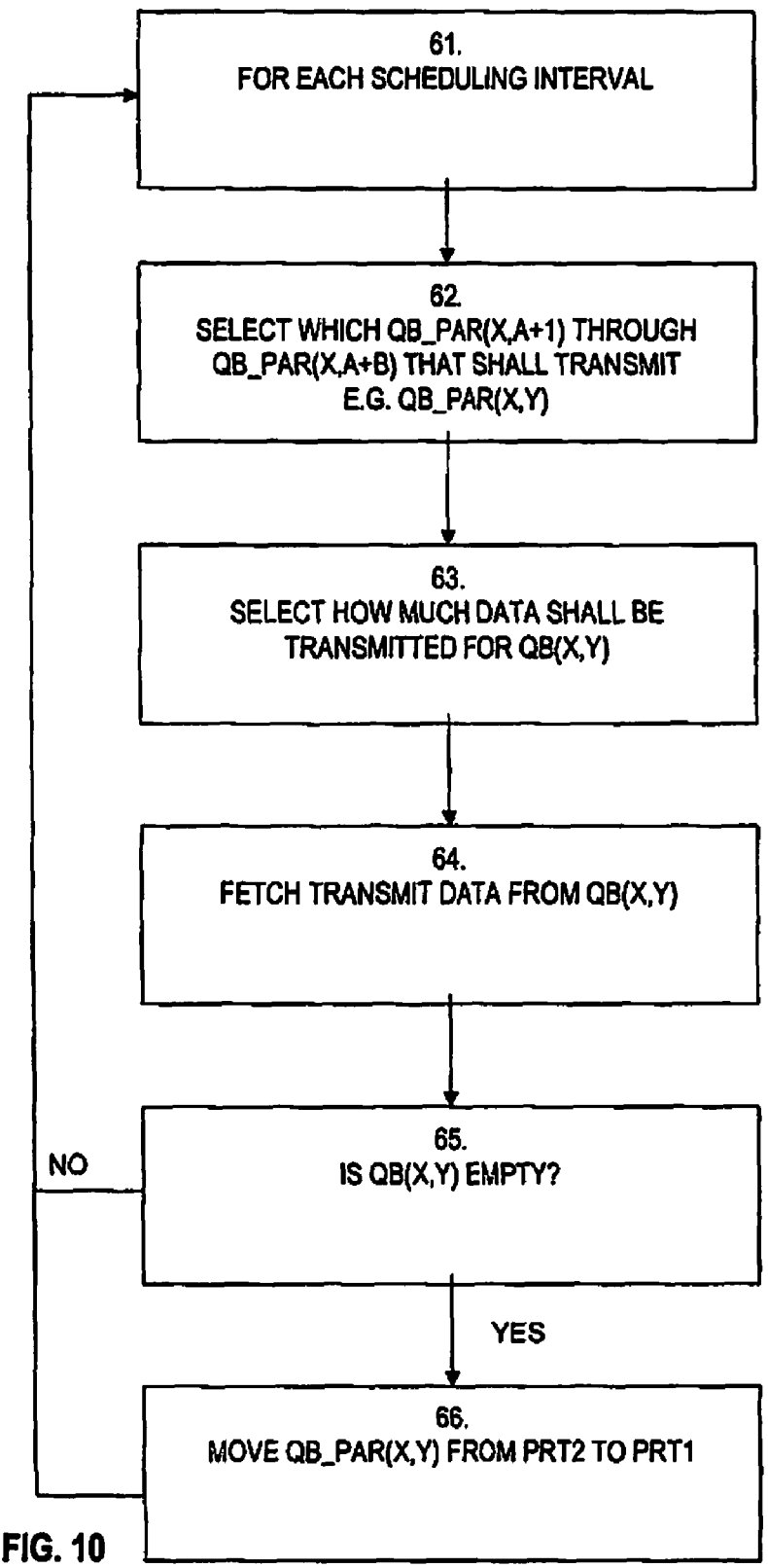
FIG. 10 shows a scheduling selection routine used in the RBS of FIG. 5.

The processor carries out a data detect routine DDR is shown in FIG. 8, the transfer routine TR is shown in FIG. 9, and the scheduling selection routine SSR is shown in FIG. 10.

The processor receives data on the Iub Interface and communicates data to the first and second memories. Finally, the processor transmits scheduled packets over the Uu interface, According to the invention, the specific scheduling selection scheme makes use of what shall be denoted as at least two memory partitions, PRT1 and PRT2.

Respective parameter data QB_PAR(X,Y) relating to respective subsets of priority queues, S1 and S2, are stored in respective memory partitions, PRT1 and PRT2.

The radio base station of FIG. 5, allows for A+B priority queues to be allocated for the service in the cell. The priority queues of the first subset S1 are not considered for scheduling, whereas the priority queues in the second subset S2 are considered. Thus, a maximum of B priority queues are considered in the scheduler at any given time. Hence, according to the invention, not all priority queues that are granted access to the service are considered for scheduling at each transmission opportunity.

According to preferred embodiment of the invention, the data detect routine DDR detects incoming data. The processor CPU is transferring parameter data between the first PRT1 and the second PRT2 memory partition, and vice versa, by means of the transfer routine TR and the scheduling selection routine SSR, respectively. The processor takes into account traffic data, or packets, which are buffered for all users in QB(X, 1), ..., QB(X, A+B). Preferably, the packet data of a priority queue remains in the first memory partition PRT1 until it is scheduled for transmission by the scheduling selection routine (SSR), as will be described in more detail later.

Parameter data of a priority queue should preferably only exist in one partition at a time, that is, redundant copies of parameter data should advantageously be avoided.

Memory

Advantageously, parameter data pertaining to the first subset S1 is arranged in slow access memory partition PRT1, while parameter data pertaining to the second subset S2, is arranged in fast access memory partition PRT2. Since stricter hardware limitations typically apply to the fast memory PRT2, liberating resources in the fast memory from the parameter data of the first subset will considerably increase the capacity of the scheduler. This has been illustrated in FIG. 7, whereby M1 is a so-called fast memory and M2 which may have the same or less efficient read access. Alternatively, both subsets are arranged in the same memory M1, but the scheduling selection routine (SSR) is aware to which set S1 or S2 a particular priority queue belongs. As mentioned above, consideration is restricted to priority queues belonging to set S2. The memory can be arranged so as to have different physical partitions of the memory for storing the set S1 and S2 respectively (PRT1, PRT2).

According to the preferred embodiment of the invention, the first memory partition PRT1 resides in an external memory while the second memory partition PRT2 resides in an internal memory. Traffic data packets P may be stored in respective buffers QB(X,Y) for corresponding priority queues PQ(X,Y) in the memory partition PRT1. Parameter data relating to queue status, e.g. channel quality average data rate etc, are divided into the first memory partition and the second memory partition, so that there is provided parameter data QB_PAR(X,1)-QB_PAR(X,A) relating to a first subset of the traffic data queues are stored in the PRT1 memory partition and parameter data QB_PAR(X,A+1)-QB_PAR(X, A+B) relating to a second subset of the traffic data queues are stored in the PRT2 memory partition. Delay indicator measures DI(X,1) through DI(X,A+B) for priority queues QB(X, 1) through QB(X,A+B) are provided in the second memory partition PRT2.

DDR

The data detect routine DDR maintains and updates the information whether data exists in queue and how long data has existed in queue without being transferred from PRT1 to PRT2. This information is denoted DI(X, 1), ..., DI(X,A+B). Parameter data of users are transferred from the first subset to the second subset by the data detect routine, when new data packets are received for an empty queue (55).

In FIG. 8, the data detect routine DDR carried out by the processor is illustrated. The data detect routine continuously monitors all incoming data packets over the Iub Interface and determines, for each received data packet step 41, which user and priority queue the data packet is belonging to among the totality of queues being provided in buffers QB (X,1) through QB (X,A+B), step 42. In the following, the corresponding queue for the individual detected packet P will be denoted PQ(X,Y), for user entity X of priority queue Y.

In step 43, it is examined whether buffer QB(X,Y), related to PQ(X,Y), already contains previous data. If yes, step 45, the packet is placed in the queue, and if no, step 44, the delay indicator DI(X,Y) is set to 1.

TR

In FIG. 9, the transferring routine TR is shown being operated in parallel to the data detect routine of FIG. 8. The transfer routine monitors delays, identifies priority queues for which packets delays are positive, moves parameter data from the first to the second memory partition and accounts for delays.

In step 51, for each transmission opportunity, for each priority queue PQ(X,Y) with a delay value DI(X,Y)>0, step 52, the parameter subset QB_PAR(X,Y), belonging to PQ(X, Y), with the highest delay value is identified, step 53. Subsequently, step 54, it is resolved whether the number of priority queues in PRT2 is lower than B.

If yes, the parameter subset QB_PAR(X,Y), belonging to PQ(X,Y), is moved from PRT1 to PRT2 and the corresponding delay value DI(X,Y) is set to 0, step 55. If no, the routine proceeds to step 56. This continues, cf. step 52, for all QB_PAR(X,Y) related to priority queues PQ(X,Y) that do not have empty buffers QB(X,Y). The parameter values having the highest delays, step 53, are transferred to the PRT2 as long as the number of parameter values in PRT2 is below B, step 54, i.e. if it is acknowledged there is space available in PRT2.

Still, for the same transmission opportunity (TTI), for each queue, step 56, those queues having a value greater than 0, step 57, are all incremented, step 58, by 1, and the routine returns to step 51, in which the routine is iterated for the next transmission opportunity.

SSR

The latter scheduling selection routine SSR is responsible for selecting which priority queue(s) should be granted resources on the air interface at every transmission opportunity for TFRC selection, for example. Alternatively any known scheduling routine known from HSPDA or elsewhere may be utilized for the actual scheduling on the air interface. According to a preferred embodiment of the invention, the scheduling selection routine SSR is provided for selection and scheduling data packets pertaining to users in a cell. The routine considers parameter data for queues of individual users (QB_PAR(X,A+1)-QB_PAR(X,A+B)). Such parameter data could contain anything forming a basis for scheduling, e.g, momentary channel quality, momentary data rate, average data rate, delay, scheduling frequency, scheduling priority etc. Parameter data of users are transferred by the scheduling selection routine SSR from the second memory partition to the first memory partition when the corresponding traffic data queues are emptied (66).

In FIG. 10, the scheduling selection routine SSR according to the invention is shown. Also this routine is commenced for each transmission opportunity, step 61.

In step 62, a selection is carried out for which priority queue that shall transmit, e.g. PQ(X,Y). The transmission is carried out according to the appropriate scheduling routine (TFR) which takes into account various factors, signal strength conditions, etc CQI Channel Quality Indicator (Measurement of the channel quality that is transmitted from UE to UTRAN). Hence the scheduling selection routine of FIG. 10 can be seen as providing the basis for which the actual scheduling (e.g. TFR) is performed; confer the denotation scheduling selection routine.

In step 63, still according to an appropriate scheduling routine, it is determined how much data shall be transmitted for PQ(X,Y).

In step 64 data is fetched from QB(X,Y) residing in PRT2 and transmitted.

In step 65 it is resolved whether the buffer QB(X,Y) is empty after the recent transmission, if no, the routine proceeds to step 61 waiting for the next scheduling interval, if yes the corresponding parameter value QB_PAR(X,Y) is moved from PRT2 to PRT1 and proceeds to step 66. If no the routine goes to step 61.

In step 66, the delay indicator is set to zero and the parameter data QB_PAR(X,Y) is moved from the first to the second memory partition.

According to the invention, the bursty nature of packet data traffic is exploited so that during periods where a given user has no data in queue, the given user is removed from being considered for scheduling, thus liberating the scheduler from CPU load and memory consumption.

Since the nature of packet data traffic is exploited, the above advantage is not present for services in which data flows exclusively continuously, e.g, streaming services.

According to a preferred embodiment of the invention, the first memory is an external memory, while the second memory is an internal memory co-located with the processor (CPU), as illustrated in FIG. 7.

Alternatively, the first and second memory partition may reside in the same monolithic chip, whereby the first memory partition is providing less fast access than the second memory partition.

Packet Handling—an Example

FIG. 11 shows the situation for one particular PQ(X,Z) for a number of TTIs, sub frames, or transmission opportunities, numbered from 1 to 14. In TTI 1 and 2 the PQ has no data and resides in memory partition PRT1. The scheduling selection routine (SSR) does not consider the PQ for transmission, denoted by "-" in the corresponding SSR field. Also the data indicator DI is 0 indicating that no data is present in this buffer QB. In TTI 3 a packet P1 arrives via its MAC-d flow and is put in the buffer QB(X,Z) via the DDR routine. At the same time DI(X,Z) is set to 1 indicating that it is the first TTI with data in queue, and queue still residing in PRT1. In TTI 3-5 the queue still contains data but is not moved to PRT2 due to lack of memory in PRT2. Hence, the DI(X,Z) increments each TTI indicating that the waiting time for the PQ with data in buffer QB increases. Also in TTI 5, a new packet P2 arrives to the priority queue buffer QB. In TTI 6 memory is supposedly liberated in PRT2 and the PQ is moved from PRT1 to PRT2. In the very same TTI the scheduling selection routine SSR selects the PQ, and its packet P1 for transmission, denoted P1 in corresponding SSR field. Hence, in TTI 7, only P2 is left in buffer QB. Also in TTI 7 the scheduler considers the PQ(X,Z) for scheduling, but it does not select it, denoted by 0 in the SSR field. In TTI 8 the scheduler scheduling selection routine once again selects the PQ(X,Z) for transmission and decides to transmit the remaining packet P2. The buffer QB is thus emptied by scheduler and moved from PRT2 to PRT1. In TTI 10 a new packet arrives and DI is set to 1. In TTI 11 through 14 the PQ cannot be moved to PRT2 due to lack of memory and hence, DI is incremented.

The invention claimed is:

1. A radio base station comprising:
   a first interface for receiving downlink data packets from a core network;
   a second interface for transmitting data packets to user entities;

a processor further comprising:

a scheduler;

a first memory partition comprising for storing, parameter data pertaining to a first subset of allocated priority queues;

a second memory partition for storing parameter data pertaining to a second subset of allocated priority queues, whereby the processor is configured to transfer parameter data between the first memory partition and second memory partitions partition, and vice versa;

whereby parameter data for priority queues having no data packets in corresponding buffers is prioritized for being transferred to the first memory partition, parameter data for priority queues having data packets in corresponding buffers is prioritized for being transferred to the second memory partition, the processor configured to perform scheduling based on a selection of priority queues whose parameter data is residing in the second memory partition.

2. The radio base station according to claim 1, wherein transferring of traffic data between the first memory partition corresponds to a selection scheduling routine and wherein the transmitting of the packets is according to a scheduling routine.

3. The radio base station according to claim 1, wherein the first memory partition moreover comprises traffic data packets in buffers pertaining to all priority queues.

4. The radio base station according to claim 1, wherein the first and second memory partitions form part of a same memory.

5. The radio base station according to claim 1, wherein the first and second memory partitions constitute at least two respective separate memories.

6. The radio base station according to claim 1, wherein the transferring of data to/from the processor to/from the first memory partition is slower than transferring of data to/from the second memory partition.

7. The radio base station according to claim 5, wherein the first memory partition is an external memory, while the second memory partition is an internal memory sharing location with the processor.

8. The radio base station according to claim 1, wherein the parameter data comprises information forming a basis for scheduling, such as momentary channel quality, momentary data rate, average data rate, delay, scheduling frequency, or scheduling priority.

9. The radio base station according to claim 1, wherein the parameter data are transferred from the second memory partition to the first memory partition when the corresponding traffic data queues are emptied.

10. The radio base station according to claim 1, wherein priority queues with highest delays are identified and moved from the first partition to the second partition.

11. The radio base station according to claim 1, wherein priority queues are moved in so far the number of parameter values in the second memory partition is smaller than a predetermined number.

12. A method for selection and scheduling data packets pertaining to users in a cell, comprising the steps of:

buffering incoming packet data relating to users in queues and establishing parameter data for queues of individual users, wherein use is made of a first memory partition having parameter data pertaining to a first subset of allocated priority queues, a second memory partition having parameter data pertaining to a second subset of allocated priority queues; and transferring parameter data between the first and second memory partitions, and vice versa, whereby parameter data for priority queues having no data packets in corresponding buffers is prioritized for being transferred to the first memory partition, parameter data for priority queues having data packets in corresponding buffers is prioritized for being transferred to the second memory partition, and whereby scheduling is based on a selection of priority queues whose parameter data is residing in the second memory partition.

13. The method according to claim 12, comprising the further step of scheduling selection routine, for scheduling/priority handling, a transfer routine, and a data detect routine for priority queue distribution.

14. The method according to claim 13, wherein the data detect routine:

continuously monitors all incoming data packets and determines, for each received data packet, to which user and priority queue data packets belong, among the totality of queues being provided;

maintains and updates whether data exists in queue and, if so, how long data has existed in queue without being transferred from the first memory partition to the second memory partition; and transfers parameter data of users from the first memory partition to the second memory partition when new data packets are received for an empty queue.

15. The method according to claim 13, wherein the scheduling selection routine selects which priority queue(s) should be granted resources on an air interface at every transmission opportunity and whereby the scheduling selection routine considers parameter data for queues of individual users.

16. The method according to claim 15, wherein the parameter data is a basis for scheduling, such as momentary channel quality, momentary data rate, average data rate, delay, scheduling frequency, and scheduling priority.

17. The method according to claim 15, wherein parameter data of users are transferred by the scheduling selection routine from the second memory partition to the first memory partition when the corresponding traffic data queues are emptied.

18. The method according to claim 13, wherein the transfer routine (TR) monitors delays, identifies priority queues for which packets delays are positive, moves parameter data from the first to the second memory partition and accounts for delays.

19. The method according to claim 13, wherein the transferring routine is operated in parallel to the data detect routine and the scheduling selection routine.

* * * * *

UNITED STATES PATENT AND TRADEMARK OFFICE
CERTIFICATE OF CORRECTION

PATENT NO. : 7,817,660 B2
APPLICATION NO. : 12/093266
DATED : October 19, 2010
INVENTOR(S) : Rikard Thomasson It is certified that error appears in the above-identified patent and that said Letters Patent is hereby corrected as shown below:

1. On the Title Page, in Field (75), under "Inventor", in Column 1, line 1, delete "Goteborg" and insert -- Molndal --, therefor.

2. In Column 2, line 15, delete "HSPDA" and insert -- HSDPA --, therefor.

3. In Column 3, line 56, delete "interface," and insert -- interface. --, therefor.

4. In Column 4, lines 55-61, delete "The data detect routine DDR maintains and updates the information whether data exists in queue and how long data has existed in queue without being transferred from PRT1 to PRT2. This information is denoted DI(X,1), ..., DI(X, A+B). Parameter data of users are transferred from the first subset to the second subset by the data detect routine, when new data packets are received for an empty queue (55)."

5. In Column 5, line 41, delete "HSPDA" and insert -- HSDPA --, therefor.

6. In Column 6, line 4, delete "PRT2" and insert -- PRT1 --, therefor.

7. In Column 6, lines 9-10, delete "corresponding parameter value QB_PAR(X, Y) is moved from PRT2 to PRT1 and" and insert -- routine --, therefor.

8. In Column 6, line 13, delete "first to the second" and insert -- second to the first --, therefor.

9. In Column 6, line 54, after "TTI 8 the" delete "scheduler".

10. In Column 7, Line 3, in Claim 1, after "partition" delete "comprising".

11. In Column 7, line 3, in Claim 1, delete "storing," and insert -- storing --, therefor.

12. In Column 8, line 27, after "queues being provided;" insert -- and wherein --.

Signed and Sealed this
Eighth Day of March, 2011

David J. Kappos
*Director of the United States Patent and Trademark Office*

CERTIFICATE OF CORRECTION (continued)
U.S. Pat. No. 7,817,660 B2

13. In Column 8, line 28, delete "maintains and updates" and insert -- the data detect routine and the transfer routine maintain and update --, therefor.

14. In Column 8, lines 31 - 34, delete "; and transfers parameter data of users from the first memory partition to the second memory partition when new packets are received for an empty queue".